(12) United States Patent
Mochizuki (10) Patent No.: US 6,763,783 B2
(45) Date of Patent: Jul. 20, 2004

(54) GRANULATED-TYPE DISCHARGED URINE PROCESSING MATERIAL FOR ANIMAL

(75) Inventor: Shotaro Mochizuki, Shizuoka-ken (JP)

(73) Assignee: Peparlet Co., Ltd., Shizuoka-Ken (JP)

( * ) Notice: Subject to any disclaimer, the term of this patent is extended or adjusted under 35 U.S.C. 154(b) by 0 days.

(21) Appl. No.: 10/458,200

(22) Filed: Jun. 11, 2003

(65) Prior Publication Data

US 2003/0196606 A1 Oct. 23, 2003

Related U.S. Application Data

(63) Continuation of application No. 10/163,588, filed on Jun. 7, 2002, now Pat. No. 6,619,233.

(30) Foreign Application Priority Data

Mar. 20, 2002 (JP) ........................................ 2002-077784

(51) Int. Cl.[7] .............................................. A01K 1/015
(52) U.S. Cl. ..................................................... 119/171
(58) Field of Search ................................. 119/171, 172, 119/173

(56) References Cited

U.S. PATENT DOCUMENTS

| | | | |
|---|---|---|---|
| 4,641,605 A | 2/1987 | Gordon | 119/173 |
| 5,143,023 A | 9/1992 | Kuhns | 119/173 |
| 5,267,532 A | 12/1993 | Franklin et al. | 119/173 |
| 5,743,213 A | 4/1998 | Fujiura | 119/172 |
| 5,743,920 A | 4/1998 | Kohan | 8/506 |
| 6,019,062 A | 2/2000 | Lombard et al. | 119/172 |
| 6,405,678 B2 * | 6/2002 | Ikegami et al. | 119/171 |

FOREIGN PATENT DOCUMENTS

JP          2534031          6/1996

* cited by examiner

*Primary Examiner*—Robert P. Swiatek
(74) *Attorney, Agent, or Firm*—Wenderoth, Lind & Ponack, L.L.P.

(57) ABSTRACT

To make development of a discharged urine absorbent portion of a granulated-type discharged urine processing material for animal correctly so that before-use and after-use can be discriminated properly. A granulated-type discharged urine processing material for animal comprises a water absorbent granular body 1 dyed with water soluble dyes or a water absorbent granular body 1 containing powder 4 of water soluble dyes, a non-continuous water soluble adhesive layer 6 formed of a plurality of adhesive non-coated parts 6b and a plurality of adhesive coated parts 6a which is coated on the water absorbent granular body 1, and a water absorbent surface layer 2 bonded to a surface of the water absorbent granular body 1 through the non-continuous water soluble adhesive layer 6, discharged urine of animal being permeated into the water absorbent granular body 1 through the water absorbent surface layer 2 and the non-continuous water soluble adhesive layer 6, thereby the water soluble dyes being eluted into the discharged urine so that the water absorbent surface layer 2 is dyed.

4 Claims, 6 Drawing Sheets

GRANULATED-TYPE DISCHARGED URINE PROCESSING MATERIAL FOR ANIMAL

This application as a Continuation Application of application Ser. No. 10/163,588, filed Jun. 7, 2002, now U.S. Pat. No. 6,619,233.

BACKGROUND OF THE INVENTION

1. Field of the Invention

This invention relates to a granulated-type discharged urine processing material for animal, which is capable of absorbing discharged urine of a pet animal such as a cat or the like.

2. Related Art

The present applicant has proposed, in his Japanese patent No. 2,534,031, a granulated-type processing material which makes color development when discharged urine is absorbed therein. This processing material includes, as described in its embodiment, a water absorbent surface layer covering the surface of a core portion (water absorbent granular body). And when the discharged urine is absorbed in the core portion through the surface layer, dyes portion dying the core portion is permeated into the surface layer, thereby enabling to discriminate the after-use part from the before-use part.

When the discharged urine is absorbed in the core portion through the surface layer, color of the core portion containing the water-non-soluble pigments can be seen through the surface layer, thereby enabling to discriminate the after-use part from the before-use part.

The above-mentioned discriminating method is included in claim 1 of the above-mentioned Japanese patent reading as "a discharged urine processing material for animal, having a water absorbent property, wherein the processing material is covered with a surface layer which exposes a color of a core portion thereof when the discharged urine is absorbed in the processing material".

A large number of the above-mentioned discharged urine processing material for animal are laid on an animal commode such as a tray for the use of a pet animal. According to the above-mentioned Japanese patent, the used portion (portion where urine has been discharged) can easily be discriminated from the non-used portion (portion where urine is not yet discharged). Since only the used portion can be replaced, the invention is economical. Moreover, the problem of emission of offensive odors from the used processing material which has been left for a long time. In addition, the processing material of this type is harmless. Owing to the above and other advantages, the above-mentioned invented processing material is widely accepted.

The present invention makes, while basing on the above-mentioned invention, a new proposal of its specific technique.

SUMMARY OF THE INVENTION

As same in the case with the above-mentioned invention, a granulated-type discharged urine processing material for animal according to a first aspect of the present invention comprises a water absorbent granular body dyed with water soluble dyes or a water absorbent granular body containing powder of water soluble dyes, and a water absorbent surface layer covering a surface of the water absorbent granular body. The water absorbent surface layer and the water absorbent granular body are bonded to each other through a non-continuous water soluble adhesive layer formed of a plurality of adhesive non-coated parts and a plurality of adhesive coated parts which is coated on the surface of the water absorbent granular body. Discharged urine of animal is permeated into the water absorbent granular body through the water absorbent surface layer and the non-continuous water soluble adhesive layer, or by dissolving the adhesive coated parts. Thereby, the water soluble dyes are eluted into the discharged urine so that the water absorbent surface layer is dyed through the non-continuous water soluble adhesive layer. By this, the used portions and the non-used portions can be discriminated properly.

The non-continuous water soluble adhesive layer is capable of locally removing only the discharged urine absorbent processing material which is dyed by absorption of discharged urine, while wholesomely maintaining the complex structure formed of the water absorbent granular body and the water absorbent surface layer.

A granulated-type discharged urine processing material for animal according to a second aspect of the present invention is characterized in that the water absorbent granular body of the first aspect of the present invention is blended with powder of water non-soluble pigments instead of the powder of the water soluble dyes or the powder of the water soluble dyes.

Discharged urine of animal is permeated into the water absorbent granular body through the water absorbent surface layer and the non-continuous water soluble adhesive layer, or by dissolving the adhesive coated-parts so that color caused by the powder of the water non-soluble pigments can be seen through the water absorbent surface layer and the non-continuous water soluble adhesive layer. By this, the used portions and the non-used portions can be discriminated properly.

The non-continuous water soluble adhesive layer is capable of locally removing only the discharged urine absorbent processing material which is color developed by absorption of discharged urine, while wholesomely maintaining the complex structure formed of the water absorbent granular body and the water absorbent surface layer.

A third aspect of the present invention provides a granulated-type discharged urine processing material for animal, characterized in that the water soluble adhesive layer of the first and second aspects of the present invention is dyed with water soluble dyes.

Discharged urine of the animal is permeated into the water absorbent granular body through the water absorbent surface layer and the dyed water soluble adhesive layer. At that time, the water soluble dyes in the dyed water soluble adhesive layer are eluted into the discharged urine, thereby dyeing the water absorbent surface layer. By this, the used portions and the non-used portions can be discriminated properly.

The dyed water soluble adhesive layer is capable of locally removing only the discharged urine absorbent processing material which is dyed by absorption of discharged urine, while wholesomely maintaining the complex structure formed of the water absorbent granular body and the water absorbent surface layer.

A fourth aspect of the present invention provides a granulated-type discharged urine processing material for animal characterized in that the water soluble adhesive layer contains therein powder of water non-soluble pigments instead of the powder of the water soluble pigments of the third aspect of the present invention.

Discharged urine of the animal is permeated into the water absorbent granular body through the water absorbent surface layer and the dyed water soluble adhesive layer. At that time, color of the powder of the water non-soluble pigments in the dyed water soluble adhesive layer can be seen through the water absorbent surface layer. By this, the used portions and the non-used portions can be discriminated properly.

The dyed water soluble adhesive layer is capable of locally removing only the discharged urine absorbent processing material which is color developed by absorption of discharged urine, while wholesomely maintaining the complex structure formed of the water absorbent granular body and the water absorbent surface layer.

A granulated-type discharged urine processing material for animal according to a fifth aspect of the present invention employs a construction in which the water absorbent surface layer of the first through fourth aspects of the present invention contains therein powder of pigments which is dried and not dissolved in moisture.

Discharged urine of the animal is permeated into the water absorbent granular body through the water absorbent surface layer and the water soluble adhesive layer. At that time, the powder of the dyes in the water absorbent surface layer is eluted into the discharged urine, thereby dyeing the water absorbent surface layer. By this, the used portions and the non-used portions can be discriminated properly.

A sixth aspect of the present invention provides a granulated-type discharged urine processing material for animal characterized in that the water soluble adhesive layer contains therein powder of water non-soluble pigments instead of the powder of the water soluble dyes of the fifth aspect of the present invention.

Discharged urine of the animal is permeated into the water absorbent granular body through adhesive non-coated parts of the water absorbent surface layer and the non-continuous water soluble adhesive layer or by dissolving the adhesive coated parts. At that time, the powder of the water non-soluble pigments color develops the water absorbent surface layer. By this, the used portions and the non-used portions can be discriminated properly.

A granulated-type discharged urine processing material for animal according to a seventh aspect of the present invention employs a construction which is characterized in that the water soluble granular body contains therein powder of water soluble dyes. Discharged urine of the animal is permeated into the water absorbent granular body, so that the powder of the water soluble dyes are dissolved in the discharged urine, thereby dyeing the water absorbent granular body. By this, the used portions and the non-used portions can be discriminated properly.

An eighth aspect of the present invention provides a granulated-type discharged urine processing material for animal characterized in that the water absorbent granular body contains therein powder of water non-soluble pigments instead of the powder of the water soluble dyes of the seventh aspect of the present invention.

By virtue of this construction, when the discharged urine of the animal is permeated into the water absorbent granular body, the powder of the water non-soluble pigments color develops the water absorbent granular body. By this, the used portions and the non-used portions can be discriminated properly.

BRIEF DESCRIPTION OF THE DRAWINGS

FIG. 1 is a sectional view showing a granulated-type discharged urine processing material for animal in which a water absorbent granular body is colored with water soluble dyes or water non-soluble pigments.

FIG. 3 is a sectional view showing a granulated-type discharged urine processing material for animal in which a colored water soluble adhesive layer is formed on a surface of a water absorbent granular body, and is a sectional view showing a granulated-type discharged urine processing material for animal in which a water absorbent granular body is colored with water soluble dyes or water non-soluble pigments.

FIG. 4 is a sectional view showing the granulated-type discharged urine processing material for animal, in which a water absorbent surface layer covering a surface of a water absorbent granular body contains therein powder of water soluble dyes or powder of water non-soluble pigments.

FIG. 6 is a sectional view showing examples in which a granulated type discharged urine processing material for animal, which is formed by tablet making, contains therein powder of water soluble dyes or powder of water non-soluble pigments.

DETAILED DESCRIPTION OF THE EMBODIMENTS

Embodiments of the present invention will now be described with reference to FIGS. 1 to 8.

Figure 1A:
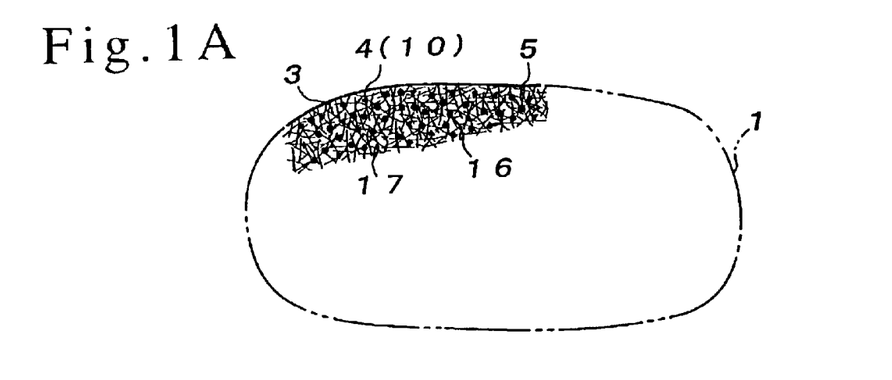
FIGS. 1(A), 1(B) and 1(C) are diagrams showing manufacturing processes thereof.
Figure 1B:
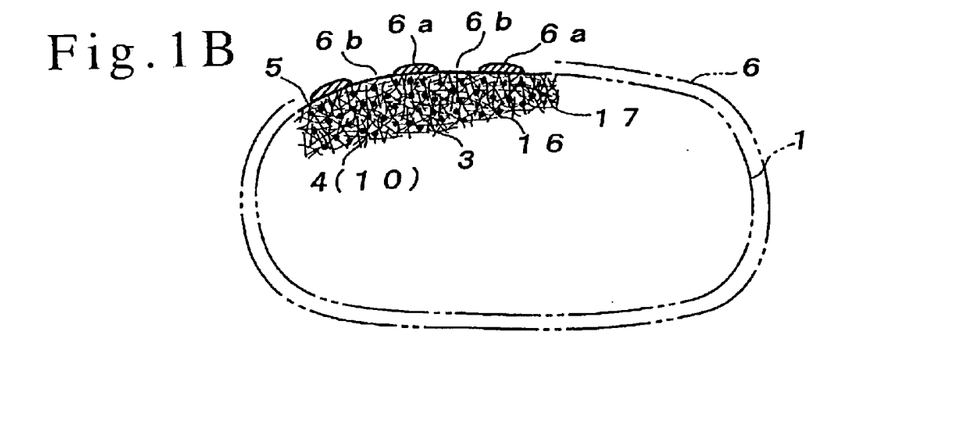
Figure 1C:
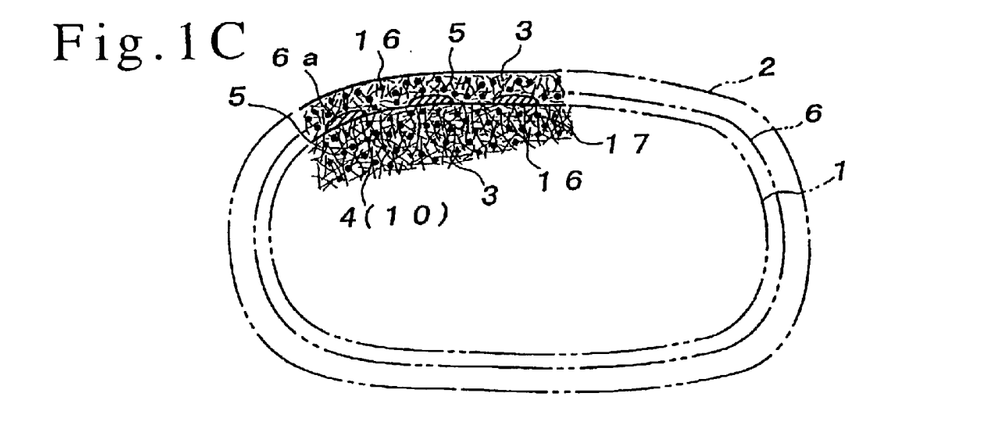
Figure 3A:
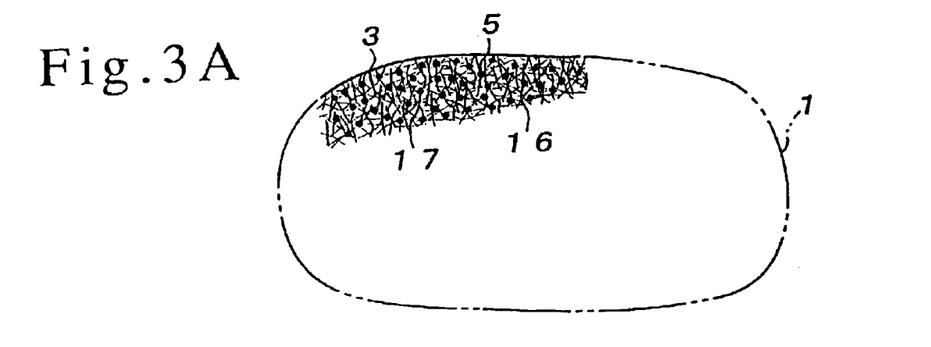
FIGS. 3(A), 3(B) and 3(C) are diagrams showing manufacturing processes thereof.
Figure 3B:
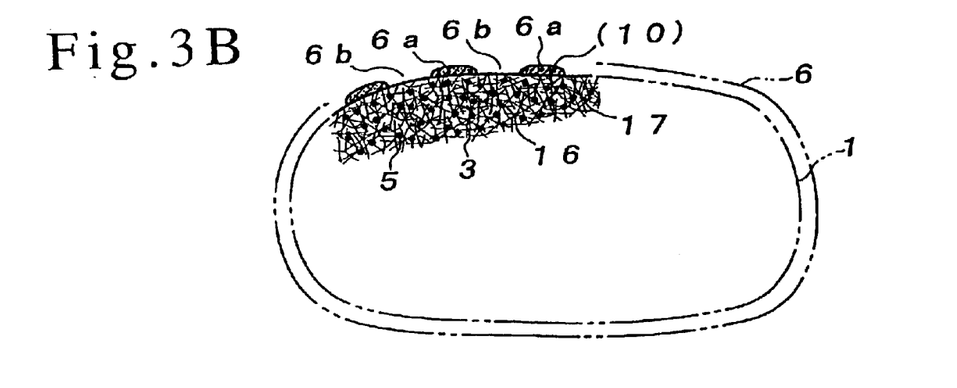
Figure 3C:
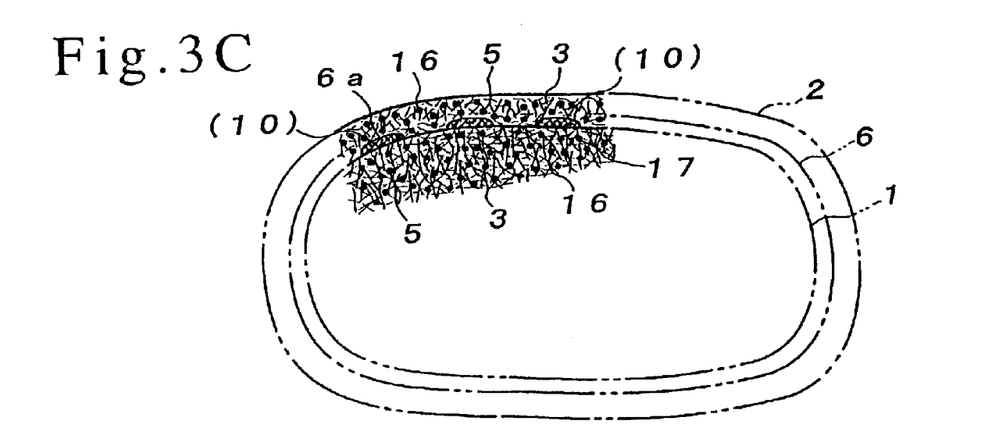
Figure 4A:
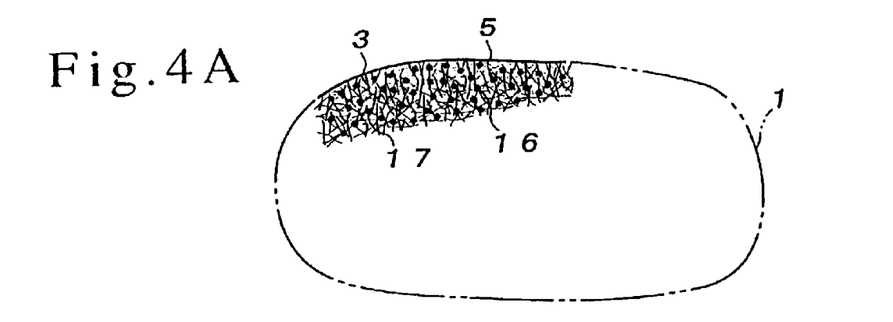
FIGS. 4(A), 4(B) and 4(C) are diagrams showing manufacturing processes thereof.
Figure 4B:
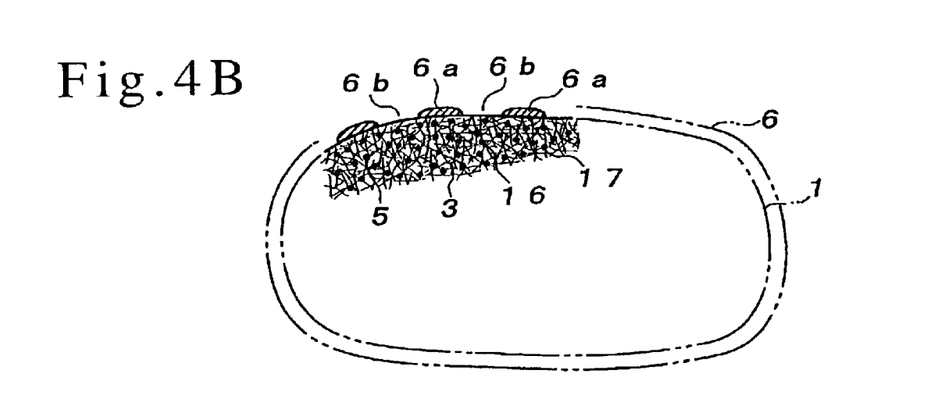
Figure 4C:
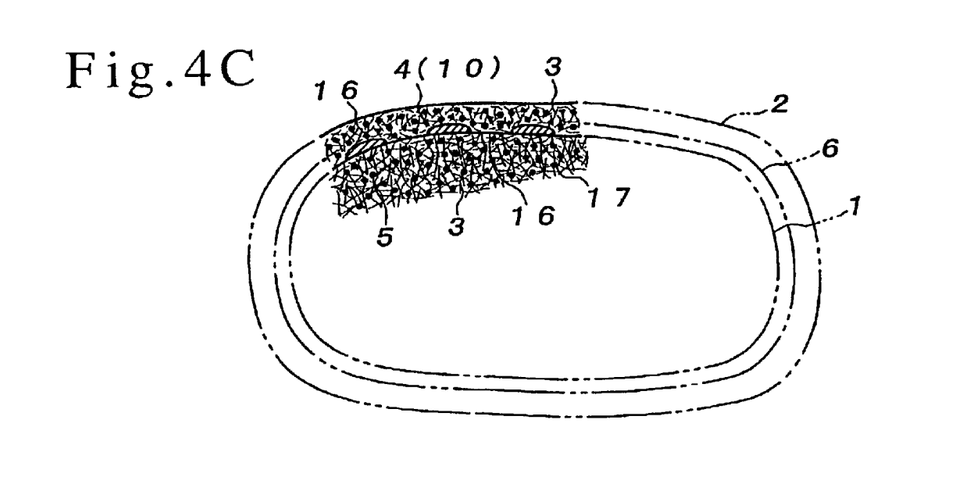

A discharged urine processing material for animal shown in FIGS. 1, 3 and 4 chiefly comprises a water absorbent granular body 1 having a particle size ranging from 1 mm to 20 mm and it has a water absorbent surface layer 2 which thinly covers a surface of the water absorbent granular body 1.

Referring to the granulated-type discharged urine processing material, the water absorbent granular body 1 is dyed with water soluble dyes. As shown in FIG. 1(A), the water absorbent granular body 1 contains therein powder 4 of water soluble dyes. Also, as shown in the same Figure, the water absorbent granular body 1 contains therein powder 10 of water non-soluble pigments. The resultant is covered with the water absorbent surface layer 2.

As shown in FIGS. 1(B), 3 and 4, the water absorbent surface layer 2 and the water absorbent granular body 1 are bonded to each other through a non-continuous water soluble adhesive layer 6 formed of a plurality of adhesive coated parts 6a and adhesive non-coated parts 6b which is coated on the surface of the granular body 1. The adhesive agent used here is a water soluble adhesive agent as represented by polyvinyl alcohol (PVA).

By spraying an appropriate amount of adhesive agent to the water absorbent granular body 1, the adhesive agent is unevenly adhered to the surface of the water absorbent granular body 1, thereby forming the adhesive coated parts 6a and the adhesive non-coated parts 6b.

The water absorbent granular body 1 shown in FIGS. 1, 3 and 4 is chiefly composed of a vegetable fiber or vegetable powder (vegetable fiber such as virgin pulp of wood, recycled pulp from used paper, bamboo pulp or the like, or vegetable powder thereof) 3 and contains therein an inorganic filler 17 such as calcium carbonate, talc or the like to add an appropriate degree of weight so that scattering is prevented.

Also, the granular body 1 contains therein powder 5 of an adhesive agent such as starch and/or carboxyl methyl cellulose (CMC) together with the inorganic filler 17. The granular body 1 further contains therein powder 16 of a water absorbent polymer as represented by sodium poly acrylate, so that the granular body 1 can have rich water absorbing and retaining properties.

Likewise, the water absorbent surface layer 2 shown in FIGS. 1, 3 and 4 is chiefly composed of a vegetable fiber or vegetable powder (vegetable fiber such as virgin pulp of wood, recycled pulp from used paper, bamboo pulp or the like, or vegetable powder thereof) 3.

The vegetable fiber as represented by pulp used herein has a fiber length ranging from about 0.1 mm to about 15 mm.

Also, the water absorbent surface layer 2 contains therein powder 5 of an adhesive agent such as starch and/or carboxyl methyl cellulose (CMC). The granular body 1 further contains therein powder 16 of a water absorbent polymer as represented by sodium poly acrylate which has rich water absorbing and retaining properties.

Figure 8:
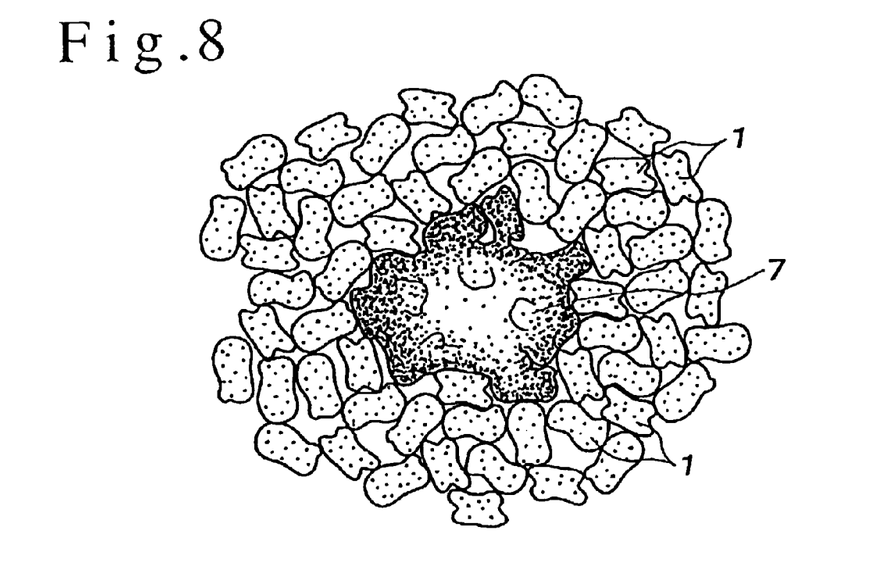
FIG. 8 is a plan view for explaining a case wherein a large number of the discharge urine processing material is laid and urine is discharged there.

The water absorbent polymer is excellent in water absorbing and retaining properties and is swollen, when water is absorbed therein, so that it captures the discharged urine correctly. On the other hand, the adhesive agent 5 used herein is a water reacting adhesive agent which is swollen to exhibit adhesive properties when moisture (discharged urine) is absorbed therein. Receiving the discharged urine, the granular bodies 1 are adhered to each other due to their adhesive properties and form a small lump 7 as shown in FIG. 8.

The mixing ratio of the vegetable fiber or vegetable powder 3 as represented by pulp, the powder 5 of adhesive agent composed of starch and or/carboxyl methyl cellulose (CMC), the powder 17 of the inorganic filler and the powder 16 of water absorbent polymer, which form the water absorbent granular body 1 shown in FIGS. 1, 3, 4 and 6, is as follows.

| | |
|---|---|
| vegetable fiber or vegetable powder | 50 to 97% |
| powder of adhesive agent | 1 to 30% |
| powder of inorganic filler | 1 to 40% |
| powder of water absorbent polymer | 1 to 30% |

The water absorbent granular body 1 shown in FIGS. 1, 3 and 4 is obtained by admixing the vegetable fiber or vegetable powder, the powder 5 of adhesive agent, the powder 16 of water absorbent polymer, and the powder 17 of the inorganic filler, then adding thereto for mixture an appropriate amount of the powder 4 of water soluble dyes or powder 10 of water non-soluble pigments and adding water thereto for kneading. And thereafter, the resultant is put into a granulating machine for compression molding.

Depending on the amount of adding water, the powder 4 of the water soluble dyes is dissolved in water and dyes the granular body 1. Otherwise, by reducing the amount of adding water, the powder 4 of the water soluble dyes keeps the form of powder. Also, the adhesive agent 45 such as starch, carboxyl methyl cellulose (CMC) or the like and the powder 16 of the water absorbent polymer are partly reacted by the addition of water and kneading, thereby keeping the form of powder.

Likewise, the powder 10 of the water non-soluble pigments keep the form of powder within the water absorbent granular body 1.

Figure 2:
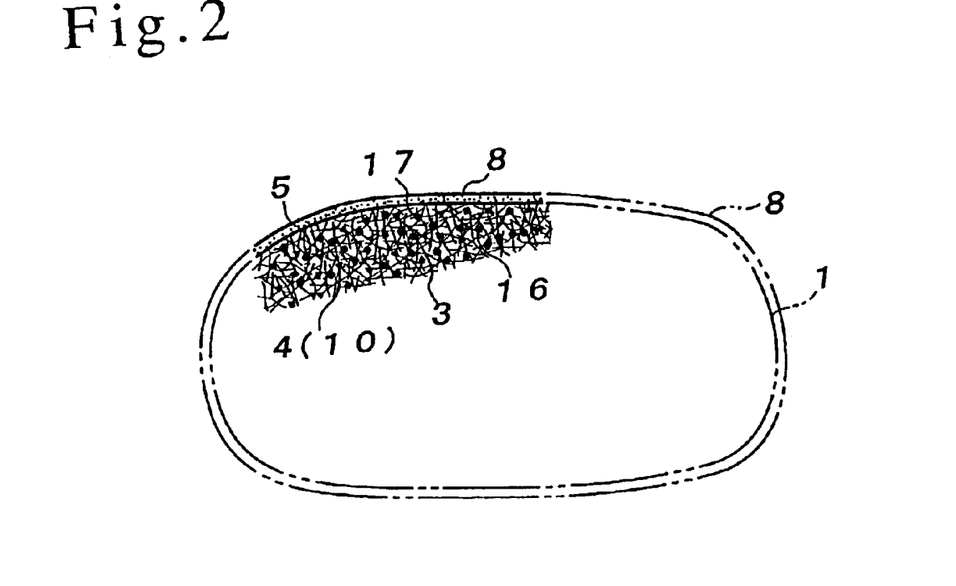
FIG. 2 is a side view showing the granulated-type discharged urine processing material for animal, in which the water soluble dyes or water non-soluble pigments of FIG. 1 is coated on a surface of the water absorbent granular body.

In the alternative, the granular body 1 is formed without admixing the powder 4 of the water soluble dyes or the powder 10 of the water non-soluble pigments, and then, a dissolving liquid of the water soluble dyes or dispersing liquid of the water non-soluble pigments is sprayed to the surface of the water absorbent granular body 1 so that the granular body 1 is colored. By doing so, as shown in FIG. 2, the dyes dissolving liquid and the pigments dispersing liquid forms a colored layer 8 on a surface layer portion of the water absorbent granular body 1.

After the water absorbent granular body 1 shown in FIGS. 1, 3 and 4 is dried, or in a wetting state of the granular body 1, a water soluble adhesive agent as represented by the above-mentioned poly vinyl alcohol is sprayed to the surface of the granular body 1, thereby forming the non-continuous water soluble adhesive layer 6 composed of the adhesive coated parts 6a and the adhesive non-coated parts 6b.

Then, as shown in FIGS. 1, 3 and 4, a mixing material composed of the vegetable fiber or vegetable powder 3, the powder 5 of the adhesive agent such as starch and or carboxyl methyl cellulose (CMC), and the powder 16 of the water absorbent polymer in the mixing ratio listed hereunder is sprinkled in a dried state, thereby forming the water absorbent surface layer 2 covering the granular body 1.

| | |
|---|---|
| vegetable fiber or vegetable powder | 40 to 98% |
| powder of adhesive agent | 1 to 40% |
| powder of water absorbent polymer | 1 to 40% |

The water absorbent surface layer 2 and the water absorbent granular body 1 are firmly bonded to each other through the non-continuous water soluble adhesive layer 6 and prevent peel-off of the component of the water absorbent surface layer 2, thereby wholesomely maintaining the attachment of the surface layer.

The water absorbent granular body 1 shown in FIGS. 1, 3, 4 and 6 are formed by compressing and granulating and therefore, the vegetable fiber or vegetable powder 3 is high in density and the water absorbent granular body 1 is lower in void than the water absorbent surface layer 2. On the other hand, the water absorbent surface layer 2 is formed by sprinkling in a dried and non-compressed state, and therefore, the vegetable fiber or vegetable powder 3 is low in density and the water absorbent surface layer 2 is higher in void than the water absorbent granular body 1. Accordingly, the water absorbent surface layer 2 rapidly absorbs the discharged urine and permeates the discharged urine into the water absorbent granular body 1.

Figure 5:
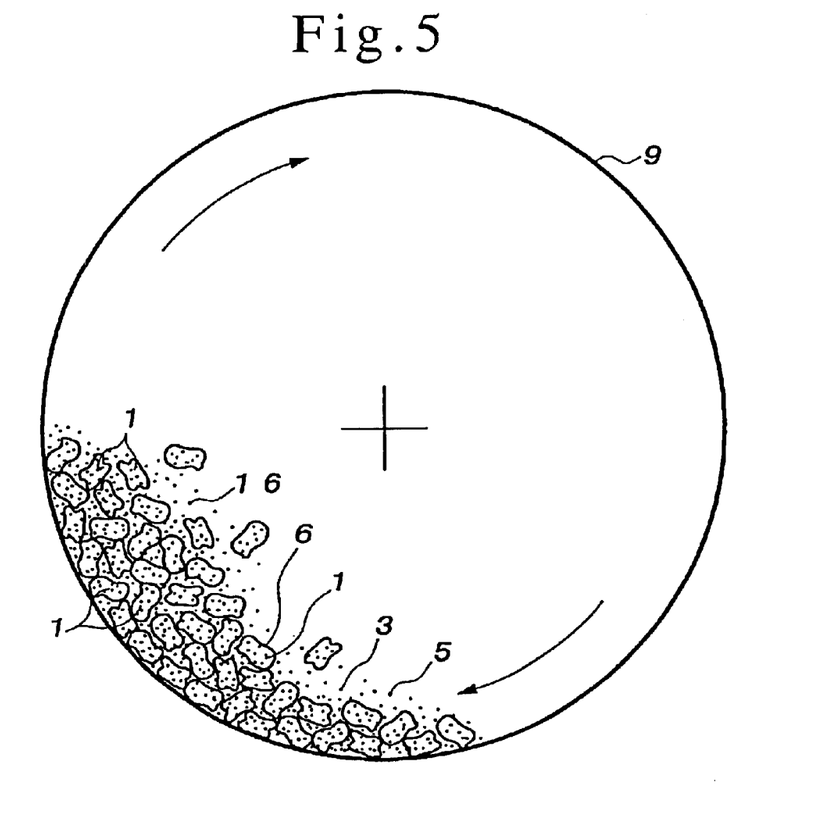
FIG. 5 is a sectional view exemplifying a method for sprinklingly attaching a water absorbent surface layer to a surface of a water absorbent granular body through a water soluble adhesive agent.

As means for forming the water absorbent surface layer 2, for example, as shown in FIG. 5, a composing material of the water absorbent surface layer 2 is charged into a rotary drum 9 in its dried state and the water absorbent granular body 1 forming the non-continuous water soluble adhesive layer 6 is further charged therein. And then, while rollingly moving the water absorbent granular body 1 on an inner surface of the rotary drum 9, the composing materials 3, 5, 16 of the water absorbent surface layer 2 are sprinklingly attached to the surface of the granular body 1.

The discharged urine of animal is rapidly permeated into the water absorbent granular body 1 through the water absorbent surface layer 2 and the adhesive non-coated parts 6b of the non-continuous water soluble adhesive layer 6. Also, the discharge urine is gradually permeated into the water absorbent granular body while dissolving the adhesive coated parts 6a of the non-continuous water soluble adhesive layer 6. At that time, the water soluble dyes, which are dissolved within the water absorbent granular body 1 to dye the granular body 1, or the powder 4 of the water soluble dyes which are contained in the water absorbent granular body 1 without being dissolved, is eluted into the permeated discharged urine to dye the water absorbent surface layer 2 through the non-continuous water soluble adhesive layer 6.

In the case where the water absorbent granular body 1 contains therein the powder 10 of the water non-soluble pigments, the color caused by the powder 10 of the water non-soluble pigments due to permeation of urine, can be seen through the water absorbent surface layer 2.

By this, the used portion (portion where urine is discharged) and the non-used portion (portion where urine is not yet discharged) can be discriminated properly.

The discharged urine processing material shown in FIG. 3 includes the water absorbent surface layer 1 and the water absorbent surface layer 2 shown in FIG. 1. The water absorbent surface layer 2 and the water absorbent granular body 1 are bonded to each other through the non-continuous water soluble adhesive layer 6.

By spraying an excessive amount of adhesive agent to the water absorbent granular body 1, the adhesive agent is adhered to the surface of the water absorbent granular body 1, thereby forming the adhesive coated parts 6a and the adhesive non-coated parts 6b. In the alternative, the surface of the water absorbent surface layer 1 is covered with the continuous water soluble adhesive layer having no adhesive coated parts 6b.

By using, as the water soluble adhesive agent, a dyed adhesive agent which is dyed with water soluble dyes and spraying the same to the surface of the water absorbent granular body 1, the dyed water soluble adhesive layer 6 can be formed on the surface of the water soluble granular body 1. The water absorbent granular body 1 is dyed with the dyed water soluble adhesive layer 6 and this dyeing is concealed with the water absorbent surface layer 2.

By spraying a dispersed liquid mixed with the powder 10 of the water non-soluble pigments in the water soluble adhesive agent to the surface of the water absorbent granular body 1, the colored water soluble adhesive layer 6 is formed on the surface of the water absorbent granular body 1 and the color is concealed with the water absorbent surface layer 2.

The discharged urine of animal is rapidly permeated into the water absorbent granular body 1 through the water absorbent surface layer 2 and the adhesive non-coated parts 6b of the non-continuous water soluble adhesive layer 6. Also, the discharge urine is gradually permeated into the water absorbent granular body 1 while dissolving the adhesive coated parts 6a. The water soluble dyes within the adhesive layer 6 is eluted into the permeated discharged urine to dye the water absorbent surface layer 2.

By permeation of the discharged urine, the color of the powder 10 of the water non-soluble pigments in the adhesive layer 6 can be seen through the water absorbent surface layer 2.

By this the used portion (portion where urine is discharged) and the non-used portion (portion where urine is not yet discharged) can be discriminated properly.

The discharged urine processing material for animal shown in FIG. 4 includes, as in the case with FIGS. 1 and 3, the water absorbent granular body 1, the water absorbent surface layer 2 and the non-continuous water soluble adhesive layer 6 for bonding the granular body 1 and the surface layer 2 together.

The granulated-type discharged urine processing material for animal has the powder 4 of the water soluble dyes contained in a dried state in the water absorbent surface layer 2 covering the water absorbent granular body 1. Also, it has the powder 10 of the water non-soluble pigments contained in a dried state in the water absorbent surface layer 2.

The discharge urine of animal is rapidly permeated in the water absorbent granular body 1 through the water absorbent surface layer 2 and the water soluble adhesive layer 6. By this, the powder 4 of the water soluble pigments in the water absorbent surface layer 2 is eluted into the discharged urine to dye the water absorbent surface layer 2.

By permeation of the urine, the powder 10 of the water non-soluble pigments in the water absorbent surface layer 2 is significantly color developed.

By this the used-portion (portion where urine is discharge) and the non-used portion (portion where urine is not yet discharged) can be discriminated properly.

Figure 6A:
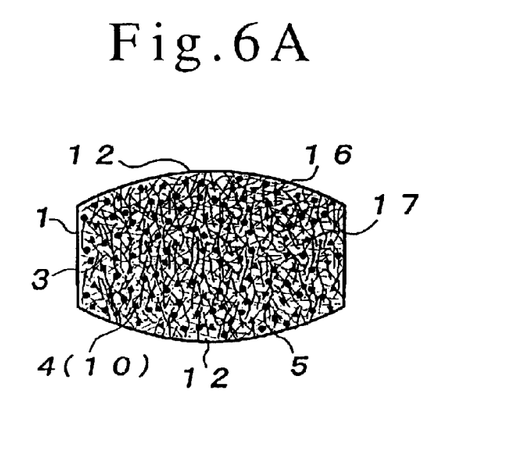
FIG. 6(A) shows a granulated discharged urine processing material which is formed in a projectingly curved configuration and FIG. 6(B) shows a granulated discharged urine processing material which is formed in a concavely curved configuration.
Figure 6B:
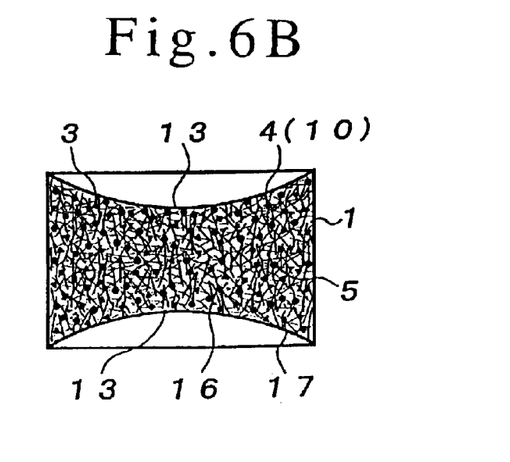
Figure 7:
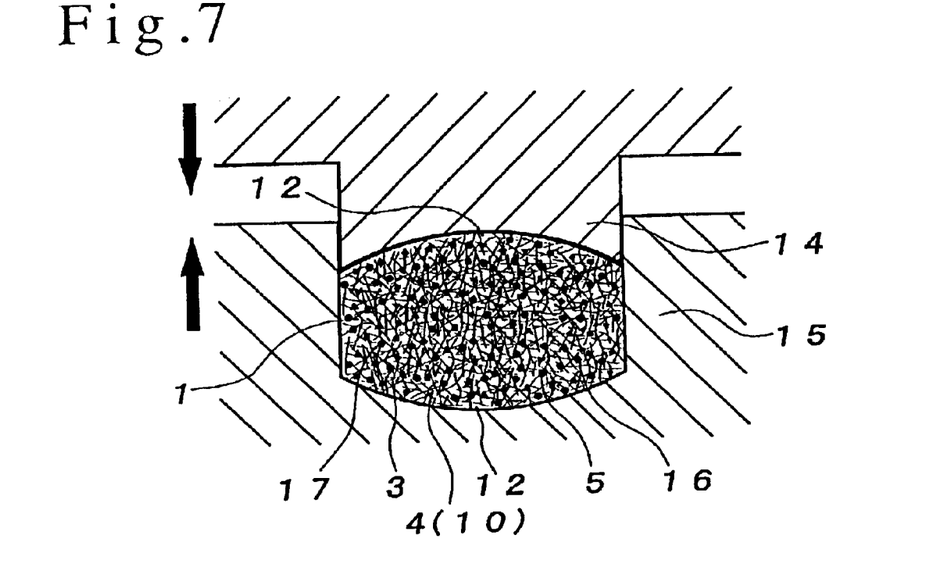
FIG. 7 is a sectional view showing a tablet making machine for a granulated-type discharged urine processing material.

The discharged urine processing material for animal shown in FIGS. 6 and 7 comprises a water absorbent granular body 1 having a predetermined shape formed from a particle of size preferably ranging from 2 mm to 20 mm by tablet making. On the other hand, the discharged urine processing material for animal shown in FIGS. 1, 3 and 4 has uneven particle shape.

The powder 4 of water soluble dyes is contained in the water absorbent granular body 1 shown in FIGS. 6 and 7. Also, the powder 10 of water non-soluble pigments is contained in the water absorbent granular body 1.

After the vegetable fiber or vegetable powder 5, the powder 5 of adhesive agent, the powder 16 of the water absorbent polymer, or the powder 10 of water non-soluble pigments is kneaded in a non-hydrolytic state, the resultant is subjected to a table-making machine so that the water absorbent granular body 1 having a predetermined shape shown in FIGS. 6 and 7 is formed by compression molding.

Also, the vegetable fiber or vegetable powder 3 and the powder 4 of water soluble dyes or powder 10 of water non-soluble pigments is admixed and kneaded in a non-hydrolytic state and made into tablet. Those powders 3, 4 alone or together with the powder 10 are selectively admixed with the powder 5 of the adhesive agent, the powder 16 of the water absorbent polymer and the powder 17 of the inorganic filler 17 and made into tablet.

The method for tablet making the water absorbent granular body 1 into a predetermined shape is disclosed in Japanese patent No. 2833697 owned by the present applicant.

The water absorbent granular body 1 is tablet made into a shape in which the front and back surfaces exhibit a convexly curved configuration as shown in FIG. 6(A) or into a shape in which the front and back surfaces exhibit a concavely curved configuration as shown in FIG. 6(B).

As shown in FIG. 7, the tablet-making machine used herein includes an upper mold 14 and a lower mold 15. A composing matter of the water absorbent granular body 1 is charged between the upper mold 14 and the lower mold 15 and compression molded. By compression molding, the water absorbent granular body 1 having a predetermined shape is obtained.

The urine of animal is rapidly permeated into the water absorbent granular body 1 having such a predetermined shape, and the powder 4 of the water soluble dyes in the granular body 1 is eluted into the permeated discharged urine, thereby dyeing the water absorbent granular body 1.

By permeation of the urine, the powder 10 of the water non-soluble pigments in the water absorbent surface layer 2 is significantly color developed.

By this, the used-portion (portion where urine is discharge) and the non-used portion (portion where urine is not yet discharged) can be discriminated properly.

What is claimed is:

1. A granulated-type discharged urine processing material for animals comprising a water absorbent granular body containing powder of water soluble dyes, wherein said water absorbent granular body is chiefly composed of a vegetable fiber or vegetable powder to provide water permeability, and discharged urine of an animal being can be permeated into said water absorbent granular body so that the powder of said water soluble dyes is eluted into the discharged urine, thereby dyeing said water absorbent granular body.

2. The granulated-type discharged urine processing material according to claim 1, wherein the water absorbent granular body contains an inorganic filler for adding weight and a water absorbent polymer for providing water retentivity.

3. A granulated-type discharged urine processing material for animals comprising a water absorbent granular body containing powder of water non-soluble dyes, wherein said water absorbent annular body is chiefly composed of a vegetable fiber or vegetable powder to provide water permeability, and discharged urine of an animal can be permeated into said water absorbent granular body so that the powder of said water non-soluble dyes makes color development of said water absorbent granular body.

4. The granulated-type discharged urine processing material according to claim 3, wherein the water absorbent granular body contains an inorganic filler for adding weight and a water absorbent polymer for providing water retentivity.

* * * * *